United States Patent [19]
Pollock et al.

[11] 3,963,404
[45] June 15, 1976

[54] METHOD AND APPARATUS FOR MULTIPLE BLOW MOLDING WITH ROTARY TURNTABLE

[75] Inventors: Donald M. Pollock, Morristown; Fulton W. Hallowell, Rumson, both of N.J.

[73] Assignee: Consupak, Inc., Morristown, N.J.

[22] Filed: July 17, 1974

[21] Appl. No.: 489,186

Related U.S. Application Data

[62] Division of Ser. No. 368,249, June 8, 1973, Pat. No. 3,854,855.

[52] U.S. Cl. ........................ 425/326 B; 425/387 B; 425/436 RM; 425/DIG. 203
[51] Int. Cl.² .......................................... B29D 23/03
[58] Field of Search ....... 425/326 B, 436, DIG. 232, 425/441, DIG. 209, DIG. 211, 305 B, 387 B, 231, 161, 163, 167, DIG. 231, DIG. 212, 145

[56] References Cited
UNITED STATES PATENTS

| | | | |
|---|---|---|---|
| 2,819,490 | 1/1958 | Froot | 425/DIG. 211 |
| 2,854,691 | 10/1958 | Strong | 425/DIG. 206 |
| 3,243,847 | 4/1966 | Fogelberg | 425/325 B |
| 3,355,763 | 12/1967 | Willert | 425/DIG. 211 |
| 3,429,002 | 2/1969 | Saffron | 425/DIG. 213 |
| 3,751,207 | 8/1973 | Mehnert | 425/DIG. 206 |

*Primary Examiner*—Francis S. Husar
*Assistant Examiner*—Robert J. Charvat
*Attorney, Agent, or Firm*—Marvin Feldman

[57] ABSTRACT

A method and apparatus are provided for multiple simultaneous blow molding operations for forming hollow objects such as containers, the method and apparatus employing at least two circumferentially spaced parison forming means with a single rotary indexing turntable. A first container is formed at one station and a second container is formed at about the same time at a second station circumferentially spaced from the first station, and the containers are simultaneously circumferentially transferred to an unloading station. The method and apparatus provide for multiple container forming and unloading operations on the same turntable. Different containers may be manufactured at the same time with one rotary indexing turntable.

10 Claims, 8 Drawing Figures

METHOD AND APPARATUS FOR MULTIPLE BLOW MOLDING WITH ROTARY TURNTABLE

This is a division of application Ser. No. 368,249, filed June 8, 1973, now U.S. Pat. No. 3,854,855, issued Dec. 17, 1974.

This invention relates to blow molding. Specifically this invention relates to manufacturing plastic containers, such as bottles wherein a parison is extruded between opposed parted mold cavities and then blown in the closed mold to final configuration by the use of internally applied air pressure. More specifically this invention relates to manufacturing plastic containers as aforesaid wherein multiple manufacturing operations are performed with a single rotary turntable.

Heretofore one extruder was employed to extrude a parison for positioning in an opened partible mold mounted on a rotary indexing turntable. The mold was then closed and the parison was formed into a container. During one rotation of the turntable the blow molded container was formed, cooled and discharged from the reopened mold, prior to the reopened mold being positioned to receive the next extruded parison. In the prior art, the container discharge station was generally that indexing station next preceding the extruder station. The reopened, emptied mold was thus transferred from the discharge or unloading station to the extruder station.

Attempts were made to increase production rates by increasing the rotational speed of a conventional size turntable. Such attempts however were of limited success as the increased angular acceleration necessitated turntable redesign which was thought to be prohibitive.

It has now been found that many thermoplastic materials could be extruded, blow molded to form a hollow object such as a container, and the formed container unloaded from a rotary turntable by utilizing less than about one-half the full rotation of a conventional size turntable at customary rotational speeds.

It has now been further found that a blow molded container may be discharged from an opened mold at an extruder station just prior to the same opened mold receiving a parison from the extruder station, without any significant increase in the extruder station indexed dwell period.

Now therefore there is provided by this invention a method and apparatus for multiple extrusions and blow molding operations with a single rotary indexing turntable thereby increasing rates of production heretofore unattainable for such turntable.

It is therefore an object of this invention to provide a method and apparatus for multiple blow molding operations to be performed with a rotary indexing turntable.

It is a further object of this invention to provide a method and apparatus as aforesaid wherein at least two extruders are circumferentially spaced adjacent a rotary indexing turntable for providing parisons at about the same time to separate molds.

It is still a further object of this invention to provide a method and apparatus as aforesaid wherein multiple parison positioning operations are actuated simultaneously.

It is still a further object of this invention to provide a method and apparatus as aforesaid wherein several different objects may be blow molded at about the same time on a rotary indexing turntable.

It is still a further object of this invention to provide a method and apparatus as aforesaid wherein the unloading of a blow molded object from the mold is accomplished at an extrusion station just prior to the positioning of a parison therewithin.

Another object of this invention is to provide a method and apparatus for loading a parison into and unloading a blow molded object from an opened partible mold with minimum dwell time.

It is a further object of this invention to provide a method and apparatus for loading a parison and unloading a blow molded object as aforesaid wherein multiple loadings and unloadings are performed at about the same time with a rotary indexing turntable.

It is a further object of this invention to provide an apparatus for unloading a blow molded object from a partible mold as aforesaid wherein the apparatus is mounted to partible sections of the mold and is cooperatively actuated with the opening of the mold.

Another object of this invention is to provide a method and apparatus for multiple blow molding with a rotary indexing turntable which is safe and practical in use and yet such apparatus is readily fabricated and of relatively inexpensive construction and practical in design and operation.

Further objects and advantages of the present invention will become apparent from the following description and the accompanying drawings which illustrate certain presently preferred embodiments of the invention and wherein:

Figure 1:
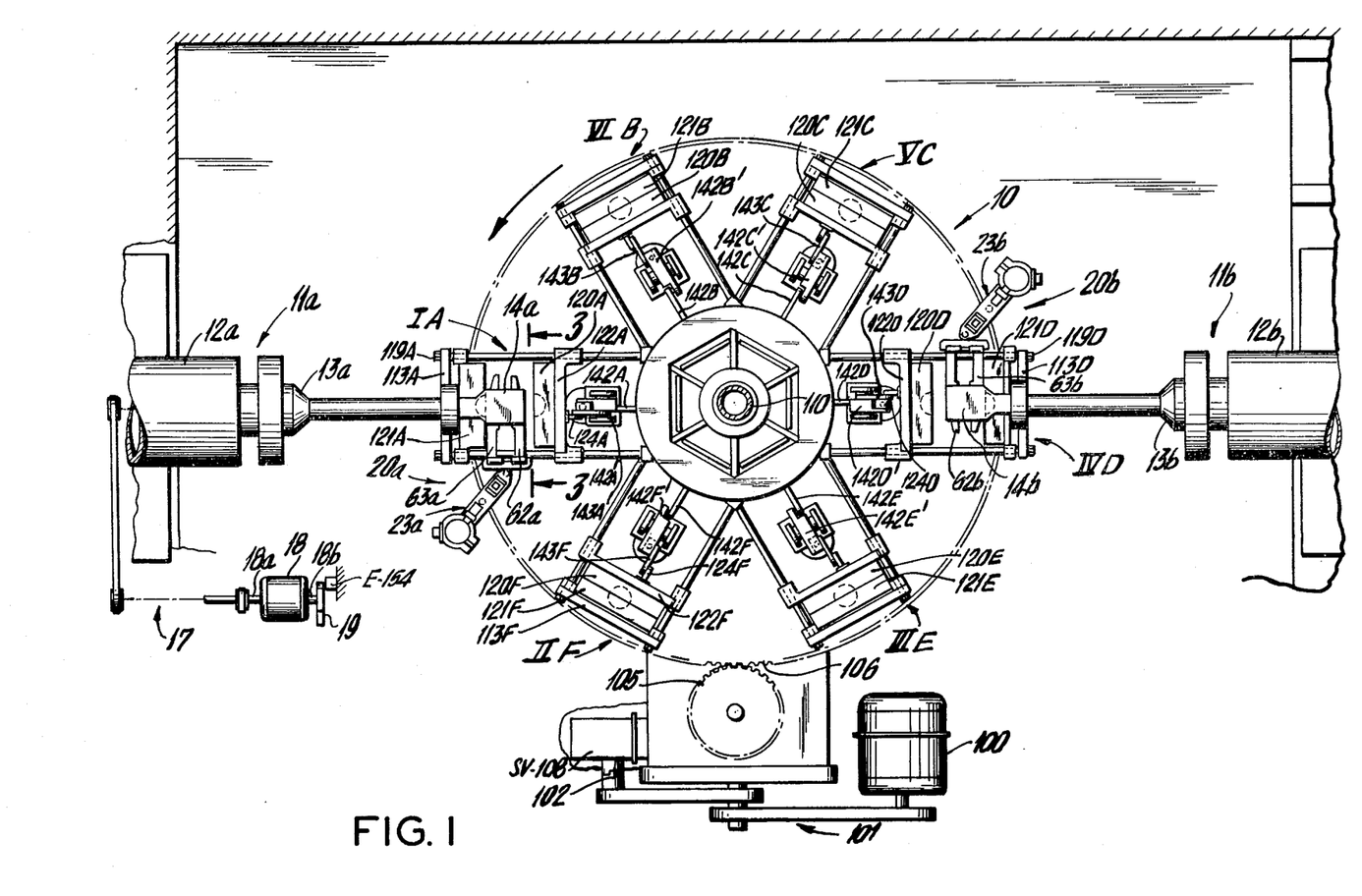
FIG. 1 is a top plan schematic view of the rotary indexing turntable and extruder stations of this invention.
Figure 2:
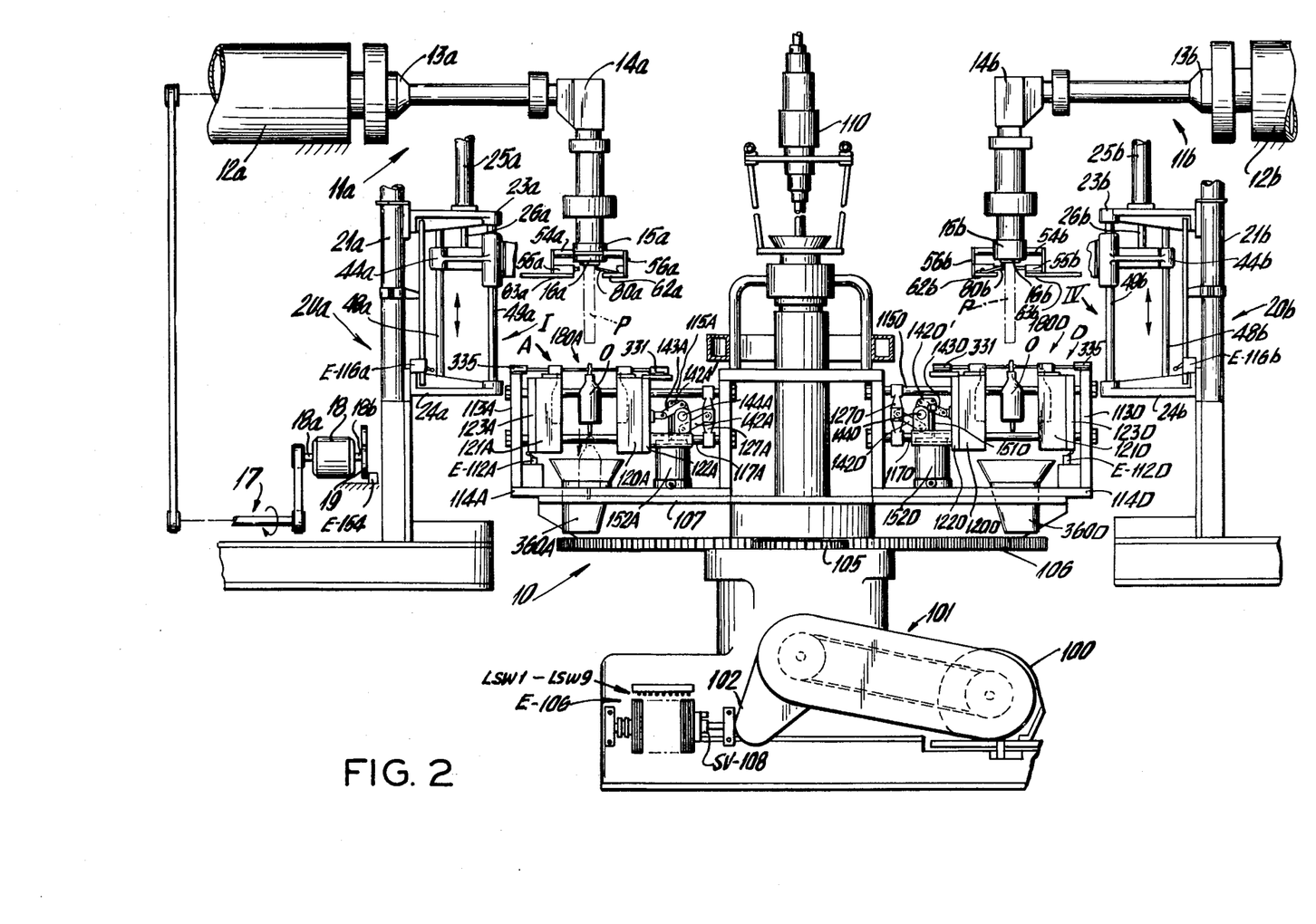
FIG. 2 is a side elevational schematic view of the apparatus of FIG. 1 depicting mold A and D at stations I and IV respectively.

Referring now to FIGS 1 and 2, there is shown a rotary indexing turntable 10 having six equiangularly spaced partible molds A through F mounted thereon. Each of the molds A–F is rotatably indexed, in seriatim, that is, each mold is sequentially stopped in rotation of the turntable 10, at each of six equiangularly circumferentially spaced stations I through VI, in the counterclockwise direction as viewed in FIG. 1. A first thermoplastic extruder 11a is operatively positioned at station I and a second thermoplastic extruder 11b is operatively positioned at station IV, diametrically disposed 180° from the first extruder. The said extruders 11a and 11b are mechanically equivalent in operation.

Each thermoplastic extruder 11a, 11b is generally of conventional design and comprises heated thermoplastic material plasticizer portions 12a, 12b respectively; extruder screw drive portions 13a, 13b respectively; cross-head die assemblies 14a, 14b respectively; outlet dies 15a, 15b respectively; and respective die faces 16a and 16b. Thermoplastic pellet material feed systems including thermoplastic material hopper and dryer assemblies are provided for each extruder and are of conventional construction and operation (not shown).

Both extruders 11a and 11b are operated at the same rate of production, and the extruder screw shaft (not shown) for each is rotated at the same rate. In the specific preferred embodiment described herein, thirty turns of each screw extruder shaft are completed for each 360° rotation or one full turn of turntable 10. Every five turns of each screw extruder expresses sufficient plasticized thermoplastic material from its respective die face to form a parison P of sufficient length to form blown object O. Said parison P after being formed is then severed from its respective die face, grabbed, lowered and positioned between a parted, opened, indexed mold, as will be more fully described hereinafter. Each parison P is then blow molded in the closed mold to form an object O, such as a container or bottle.

The screw extruder shaft of extruder 11a is mechanically interconnected through belts and pulleys 17 to the input end 18a of reducing coupling 18. At the output end 18b of reducing coupling 18, there is mounted a cam 19. Every five turns of the screw extruder input shaft results in one rotation of cam 19. In each rotation of cam 19, micro switch E-154 is actuated. Each rotation of cam 19 constitutes one indexing cycle at each station I and IV.

In the following discussion the parison loader apparatus of station I is denoted by the suffix a, in contradistinction to the parison loader apparatus of station IV wherein the equivalent apparatus features are denoted by the suffix, b.

Micro-switch E-154 is electrically connected to parison loaders 20a and 20b for extruders 11a and 11b respectively. The parison loaders 20a and 20b are mechanically equivalent. The function of the parison loaders is to sever the parison P from the respective die faces 16a and 16b, grab or pinch the parison at the top severed end and then lower the parison so as to position the parison between parted halves of an opened mold.

Figure 3:
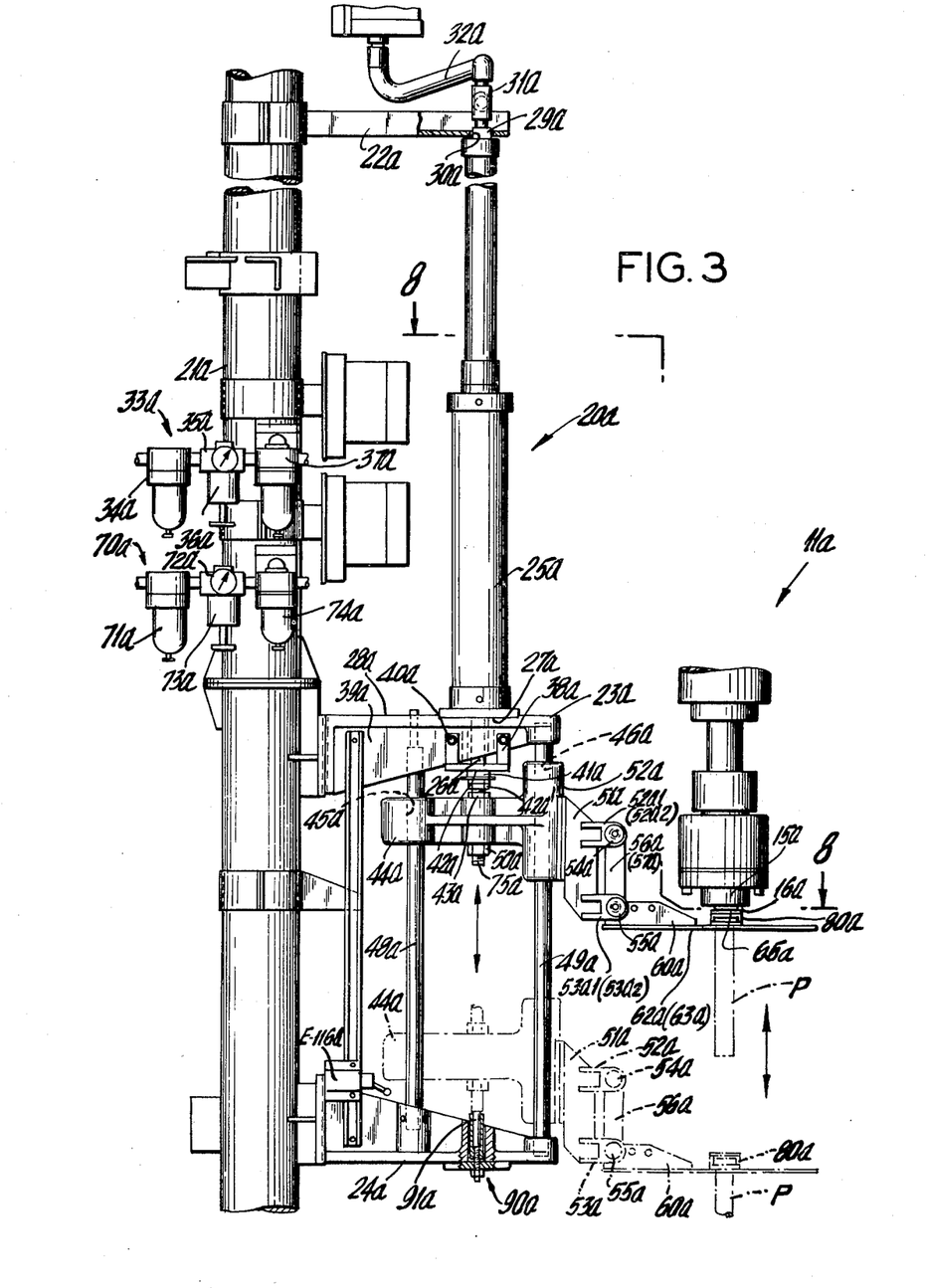
FIG. 3 is a side elevational view of the parison loading apparatus taken along line 3—3 of FIG. 1.
Figure 8:
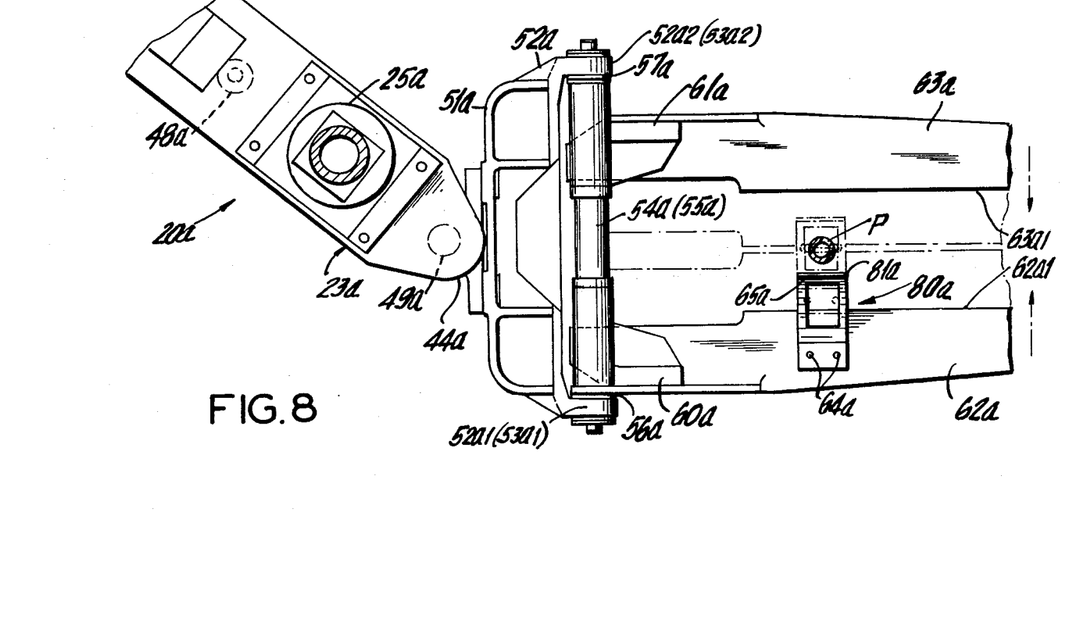
FIG. 8 is a partial sectional view taken along line 8—8 of FIG. 3.

Referring now specifically to FIGS. 3 and 8 there is shown parison loader 20a. A tubular support frame 21a supports a cantilevered top flange member 22a, cantilevered intermediate flange member 23a and a cantilevered bottom flange member 24a. Flange members 23a and 24a are generally of the same configuration and are in opposed facing relationship. Supportedly mounted between cantilevered intermediate flange 23a is a vertically disposed pneumatic cylinder 25a. A retractably extensible ram 26a is slidably received in the bottom end 27a of cylinder 25a. End face 27a of parison loader 25a is mounted to the top face 28a of flange 23a. An upper portion 29a of cylinder 25a is mounted through hole 30a of the bottom part of flange member 22a, and retained therein. A pneumatic hose 32a, through connection 31a, is secured to the top end of cylinder 25a. A compressed air feed line for cylinder 25a generally shown as 33a is mounted to frame support 21a and comprises a filter 34a, a pressure gauge 35a and pressure reducing valve 36a, and a lubricator 37a.

As stated a retractably extensible ram 26a is in sliding engagement with the bottom 27a of pneumatic cylinder 25a. A guide fixture 38a depends from and is mounted to vertical depending portion 39a of flange 23a, by means of bolts 40a (typical). Stop member 41a is fixedly mounted at an intermediate portion of ram 26a and contactingly engages the lower face 42a of guide fixture 38a. Member 41a is in turn disconnectably fixed in place by nut 42a'. Ram 26a passes through parison lowering member 44a being held in place by means of nuts 43a and 50a. Parison lowering member 44a is provided with two vertically disposed through holes 45a and 46a for sliding engagement with two vertically disposed spaced rods 48a and 49a respectively. The top and bottom ends of each of the rods 48a and 49a are securely mounted to flanges 23a and 24a respectively. A bracket 51a is mounted to the side 52a of parison lowering member 44a, that is, that side of the parison loading member 44a that is in facing relationship with the die 15a of extruder 11a. Extending outwardly from bracket 51a are two pair of spaced bracket portions 52a1, 52a2, 53a1 and 53a2. A pair of double acting air cylinders 54a and 55a are horizontally, transversely disposed to and mounted through and between one each of the two pair of brackets. That is one cylinder each is mounted between one of said pair of bracket portions 52a1, 52a2, 53a1 and 53a2. Between and at the ends of the cylinders 54a and 55a, plates 56a and 57a respectively, are fixedly mounted so as to be movable with the retraction and extension of the rams for the cylinders 54a and 55a. A pair of facing vertically disposed angle flanges 60a and 61a are also mounted for horizontal movement with the simultaneous double acting extension and retraction of the rams of pneumatic cylinders 54a and 55a. A pair of horizontally disposed plates or jaws 62a and 63a are mounted to respective flanges 60a and 61a, that is, one jaw for each flange. Of course the flanges 60a and 61a and in turn the jaws 62a and 63a would be moved toward and away from each other with retraction and extension by cylinders 54a and 55a.

Mounted to the top face of jaw 62a is parison severing member 80a. The parison severing member is fixedly mounted to jaw 62a by means of bolts 64a (typical). The top edge 81a of parison severing member 80a is in sliding resilient relationship with die face 16a of extruder 11a.

A compressed air supply line generally shown as 70a is provided to supply compressed air to both cylinders 54a and 55a. Compressed air supply line 70a comprises a filter 71a, a pressure gauge 72a, reducing valve 73a and lubricator 74a. Compressed air conduits from supply line 70a to the cylinders 54a and 55a are not shown.

Referring now specifically to FIG. 8, there is shown parison P centrally axially located on the line of closure for jaws 62a and 63a. Edge portions 62a1 and 63a1 of jaws 62a and 63a are in facing relationship. In the retraction of cylinders 54a and 55a, jaws 62a and 63a move toward each other and edge portions 62a1 and 63a1 contactingly, grippingly pinch parison P. Edge portion 81a faces upardly from face 65a of 80a so as to sever the parison P from die face 16a. The severing edge 81a completely passes through parison P after jaw edges 62a1 and 63a1 have securely, grippingly, retained the parison therebetween. Parison severing member 80a is provided with a cut-out 82a to prevent adhering of the top circumferential edge of the parison after severing and also to prevent adhering of the bottom leading edge of the next formed parison (not shown). The broken line construction of FIG. 8 depicts the jaws 62a and 63a closed on the parison and in a lowered position. When cylinder 25a is actuated by cam actuated micro-switch E-154, ram 26a is extended downwardly thereby lowering member 44a as it slidably engages rods 48a and 49a.

Micro-switch E-154 simultaneously actuates pneumatic cylinders 54a, 55a and 25a, so that as pneumatic cylinder 25a begins to lower member 44a, cylinders 54a and 55a are being retracted so as to retract or close plates or jaws 62a and 63a on parison P. Inasmuch as the parison lowering member 44a has a mechanical lag as compared with the quicker acting jaws 62a and 63a, the parison is severed (by severing member 80a) and grabbed (by jaws 62a and 63a) just prior to being lowered.

In lowering the parison, member 44a moves to a lowered position as shown in broken line illustration. An adjustable stop 90a is affixedly mounted to bottom flange 24a, so that upon descent of member 44a, lower depending end portion 75a of shaft 26a contactingly abuts protruding shaft end portion 91a of stop 90a. The stop 90a is adjustable to insure the proper vertical positioning of parison P in the opened mold (not shown in FIG. 3).

Further as lowering member 44a nears the end of its descent, micro-switch E-116a is contacted and actuates the closing of mold A at station I, as will be fully discussed hereinafter. It is of course understood that at about the exact same time, parison severing, grabbing and lowering operations are also being performed at station IV, so as to lower a second parison into opened mold D and similarly, micro-switch E-116b would be actuated to close the parted mold sections of mold D on said second parison.

Referring again to FIGS. 1 and 2, the rotary turntable, generally shown as 10 is of conventional size and generally of conventional construction with certain modifications as will be discussed hereinafter. The turntable 10 is driven by a standard 10 h.p. motor 100 which is connected through belts and pulleys generally shown as 101 to clutch 102 actuatable by clutch valve SV-108. The clutch 102 is a MO7S Posidyne, manufactured by Force Control Industries, Hamilton, Ohio. A master cam E-106 for the rotary turntable is mounted adjacent to the drive motor 100 and is operatively connected to clutch solenoid valve SV-108. The master cam is an Allen Bradley Buttetin 803, Style E, Model 9E manufactured by Allen Bradley Co., Milwaukee, Wisconsin. The master cam E-106 comprises nine distinct limit switches, LSW1 through LSW9 inclusive L.S.W.'s 1, 2, 4 and 7 not being utilized for the particular embodiment of the invention as described herein. Each of the operable L.S.W.'s are designed so as to be actuated during particular times during rotation of the turntable for the sequential timing of the several blow molding operations.

When clutch 102 is engaged the drive motor drives circumferential gear 105 which in turn engages the circumferental gear 106 of turntable so as to cause rotation of the turntable in the counter-clockwise direction as viewed in FIG. 1. Thusly, mold A moves from station I to station II and mold E moves from station II to station III, and so forth.

A cylindrical support column 110 is axially disposed to rotary turntable 10 and is mounted to base frame 107 of rotary turntable 10. Support column 110 is provided with connection for compressed air and water for performing blow molding operations for each mold, in the conventional manner. At the upper end of support column 110 is a commutator 111 which maintains electrical connection from the master cam E-106 to and from the parison loaders 20a and 20b and the several molds, as the turntable is rotated.

Figure 4:
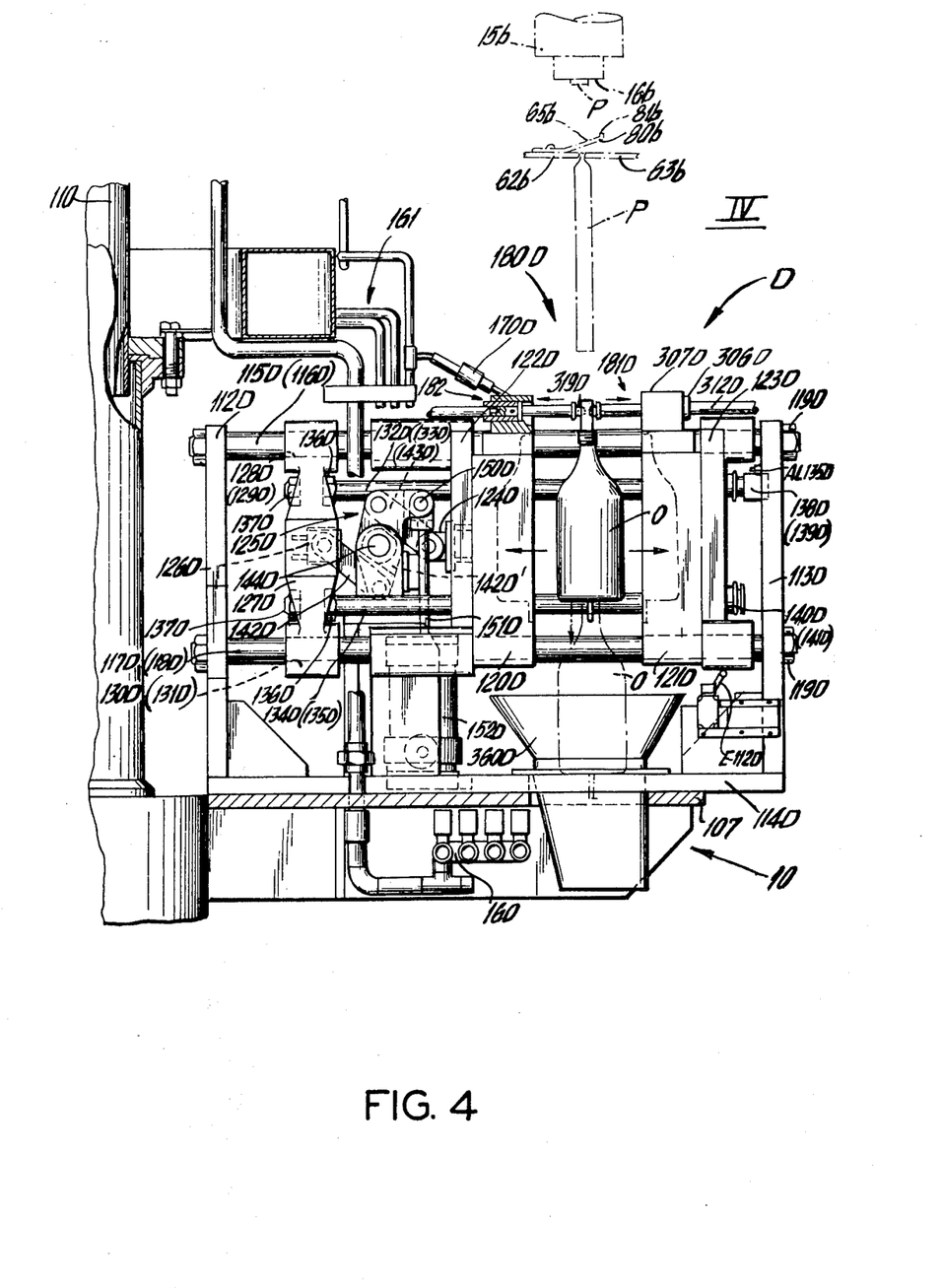
FIG. 4 is a side elevational view of mold D at station IV, depicting in action sequence container unloading and parison loading operations.

Referring now specifically to FIG. 4, there is shown mold assembly D in the opened position at station IV, although it is of course to be understood that this opened mold disposition is typical of each mold at either station I or station IV. It is also of course understood that all of the molds have corresponding features and each of the suffixes A-D denote a particular mold.

Mold assembly D comprises a vertically disposed inner support frame 112D and a spaced, opposing, facing, vertically disposed, outer support frame 113D. Frames 112D and 113D are fixedly mounted to member 114D which in turn is mounted to frame 107. Four horizontally disposed, spaced mold support rods 115D, 116D, 117D and 118D are transversely fixedly mounted to and between support frames 112D and 113D by means of nuts 119D (typical). Two sections 120D and 121D of partible mold D are slidably mounted on support rods 115D, 116D, 117D and 118D. The mold sections 120D and 121D are disconnectably connected to brackets 122D and 123D respectively. One end 124D of linkage assembly 125D is fixedly secured to bracket 122D and the other end 126D of linkage assembly 125D is fixedly secured to member 127D. Member 127D is formed with four through holes 128D, 129D, 130D and 131D for sliding engagement with support rods 115D, 116D, 117D and 118D, respectively. Four mold close rods 132D, 133D, 134D and 135D are fixed secured at one end of each thereof to member 127D by means of nuts 136D and 137D (typical). The other respective ends of rods 132D-135D inclusive are secured to bracket 123D by means of caps 138D, 139D, 140D and 141D, respectively.

Linkage 125D comprises a series of linkages 142D, 142D' and 143D; linkage 142D at one end being pivotally connected to bracket 127D and at the other end being pivotally connected to linkage 142D; linkage 142D' in turn is rotatably mounted on shaft 144D and the other end of linkage 142D' is pivotally connected to linkage 143D; and linkage 143D is in turn pivotally connected to bracket 122D. A drive linkage assembly 150D is mounted to the pivotal connection of linkages 142 and 143 and said linkage assembly is fixedly mounted to vertically disposed retractably extensible ram 151D of pneumatic cylinder 152D.

By this manner of construction mold D is opened by the actuation of solenoid valve SV-117D to deliver compressed air to cylinder 152D to cause the vertical extension of ram 151D causing the upward movement of drive linkage 150D which in turn causes counter-clockwise rotation of pivotal connections of linkages 142D' and 143D, and 142D and 142D' about shaft 144D. This linkage rotation results in mold section 120D and member 127D being drawn closer in sliding on support rods 115D-118D, inclusive. Mold section 121D is concomitantly moved away from its counterpart sections 120D by the reaction of member 127D pushing rods 132D-135D, inclusive. To close the mold D, solenoid valve SV-117D is actuated to deliver compressed air to cylinder 152D to cause the downward retraction of ram 151 which in turn causes the downward movement of drive linkage 150D which in turn results in the clockwise rotation of the aforesaid pivotal connections. The linkages 141D, 142D' and 143D are thusly extended causing mold section 120D and 121D to close at a pre-calculated centerline disposed below the axis of the parison P at station IV.

Figure 5:
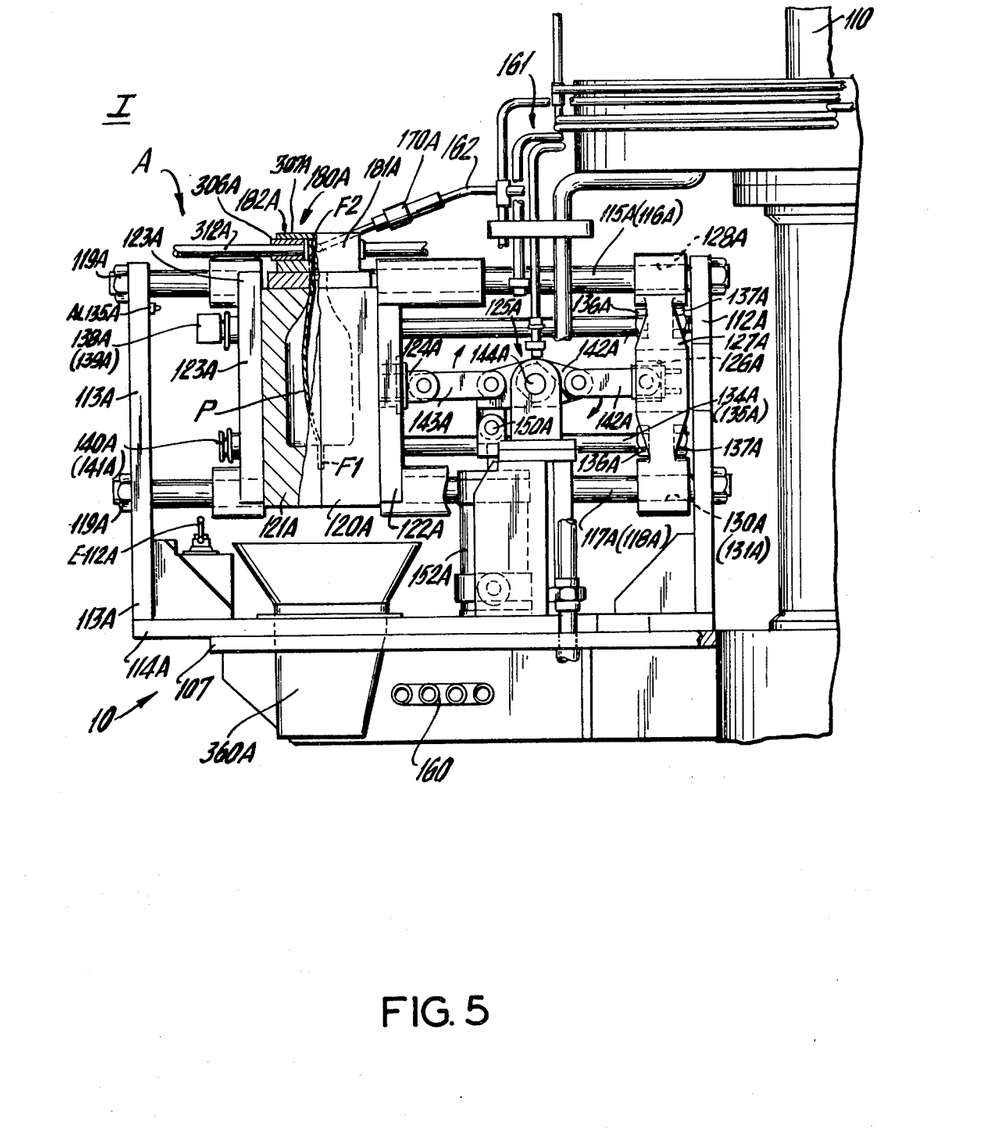
FIG. 5 is a side elevational view of mold A in partial sectional view, at station I, immediately upon closure of the mold.

In FIG. 5, mold A is depicted as having just been closed on a lowered parison. The linkages 141A, 142A and 143A are shown extended horizontally. The rotational direction arrows about shaft 144A at station I are corresponding opposite to those of shaft 144D at station IV.

Coolant fluid such as water is supplied to and returned from the molds through piping 160. Compressed air is supplied through a common rotary connection (not numbered) and is separated into two air feed systems to wit; the mold open-close air supply system, generally shown as 161, and the parison blow molding air supply system, generally shown as 162. The mold open-close air supply system supplies compressed air to pneumatic cylinders 152A–152D. The parison blow molding air supply system supplies compressed air to blow pipe assemblies 170A–170D.

Each blow pipe assembly 170 (A–D) is of usual design, such as by way of example the blow mold cylinder described in U.S. Pat. No. 3,334,773. The blow pipe assembly pierces the parison enclosed in the mold and then introduces compressed air to the interior of the parison so as to cause the parison to expand to conform to the interior of the mold configuration, thereby forming a blown object O such as a container and the like. In FIG. 5, mold A is enclosed on parison P and is pinching the parison, the lower end thereof is pinched and sealed so as to form bottom flash F1 and the top end of the parison pinched to form top flash F2. The parison P in FIG. 5 is thus ready for the introduction of compressed air.

It is also noted in FIG. 5 that in closing mold sections 120A and 121A, two corresponding sections 181A and 182A, respectively, of container unloader assembly 180A are closed about parison flash F2.

Figure 7:
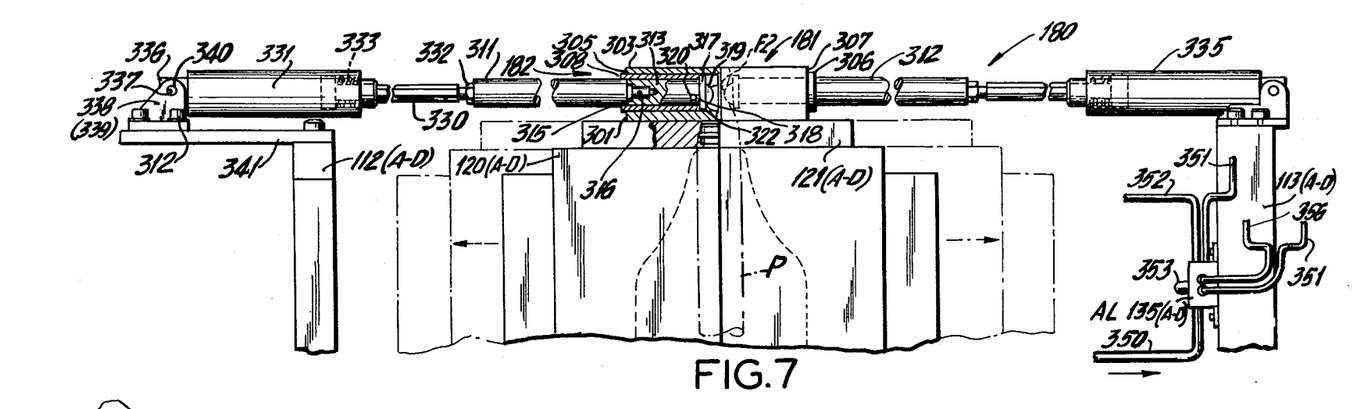
FIG. 7 is an enlarged side elevational view of the container unloader.

In FIG. 7 the solid line drawing depicts the closed mold sector with a parison or object therewith. The broken line drawing depicts the container unloader 180 with the mold sections pushed away from one another.

Unloader assembly 180 (typical of A–D) comprises a pair of opposed facing symmetrical sections 181 and 182. The following discussion is generally limited to section 182 but it is of course understood that corresponding features are found in section 181. Each section comprises a mounting base, as 301 fixedly secured to a respective neck portion of the mold section 120 (typical A–D). Spaced above and in facing relationship to the base is a top 303. Sides 305 and 307 enclose the top 303 and base 301. Side 307 is shown for section 181. A bushing 308 fixedly secured between the bottom face of top 303 and the top face of base 301. A rod 311 is slidably received through bushing 308 of section 182 and rod 312 is slidably received through bushing 306 of section 181. Rod extension member 313 is fixed to post 315 of rod 311 by means of pin 316.

A washer 317 is mounted to end face 318 of rod extension member 313 by means of a spherical headed bolt 319. Bolt 319 is secured to extension member 313 by means of pin 320. The outer face, of washer 319 is in contacting relationship with end 322 of bushing 308 when the mold is closed.

The spherically-shaped end 319 is off-set from the axis of the rod. This spherical shaped surface pressing contacts the parison top flash portion F2. That is the opposed facing spherically headed bolts pinch the parison as the mold is closed on the lowered parison. In FIG. 7, P is shown in pinched in construction The opposed bolts 319 and its counterpart are in horizontal axial alignment. The spherical ends of bolt 319 and its counterpart push the top flash of the parison along a line about coaxial with the center of gravity of the object. This coaxial alignment assures that the object O will fall free straight down without cocking in a direction because of imbalance, when released by the unloader.

Rod 311 is attached by nut 332 to retractably extensible ram 330 of pneumatic cylinder 331. A compression spring 333 is housed in air cylinder 331 so as to bias the rods away from the center-line of the meeting line at which the molds close. The compression spring force is from about 5 to about 20 pounds and is readily overcome by the action of the closing molds which pull the rods 311 and 312 towards each other.

The other end of pneumatic cylinder 331 is formed with a flange 336 having a transverse through hole. Said through hole is coaxial with through hole 337 of upright flange 338. A second upright flange 339 having a coaxial hole is mounted on the other side of cylinder flange 336. A pin 340 passes through the aforesaid holes so as to provide a pivot for cylinder 331. Flanges 339 and 338 are bolted to plate 341 by bolts 342 (typical) which plate 341 in turn is welded to and bolted to vertical mold frame support 112 (typical A-D). The opposing air cylinder 335 is likewise pivoted and bolted to opposing mold frame support 113 (typical A-D).

A 3-way valved air limit switch AL-135 is fixedly mounted to the inward face of mold frame support 113 (typical A-D). The switch AL-135 is constructed and positioned so that upon opening of the mold (A-D), mold section bracket 123 (A-D) trips the switch as the opened mold clears the major sectional dimension of the container O.

Container O is of course being held in place between the unloader rods under a force exerted by compressed air to the inlet sides of cylinders 331 and 335. The compressed air being supplied from the air source interconnected to SV-117. That is as the signal to open the mold is provided by LSW3 (cam E-106) the actuation of SV-117 (A-D) provides compressed air not only to open the mold but to prime the unloader cylinders as well. In this manner, container O remains in place as the mold is opened.

Switch AL-135 interconnects a compressed air supply line 350 which is interconnected from a tap line from SV-117 (A-D) and then to the inlet sides or pressurization sides of each of unloader cylinder 331 and 335, respectively, through lines 351 and 356. Switch AL-135, on its outer outlet side is interconnected to the outlet side or depressurization side of each of the unloader cylinders 331 and 335 through lines 352 and 353, respectively. In this manner of construction, as switch AL-135 is actuated, the compressed air lines 351 and 350 are closed so as to discontinue the pressurization of cylinder 335 and 331, and the compressed air in the cylinders is expelled through lines 352 and 353 to the atmosphere.

As the compressed air is expelled from unloader cylinders 331 and 335, compression springs 333 in cylinder 331 and its counterpart in cylinder 335 drive the rods 312 and its counterpart 311 away from the container O, thereby permitting the container to fall free clear of the parted mold sections 120 (A-D) and 121 (A-D). The container falls into hopper 360 (typical A-D) for conveyance to the trim and finishing operations (not shown).

The afore-described apparatus is operated in the manner as hereinafter described with particular reference being made to FIG. 6.

Figure 6:
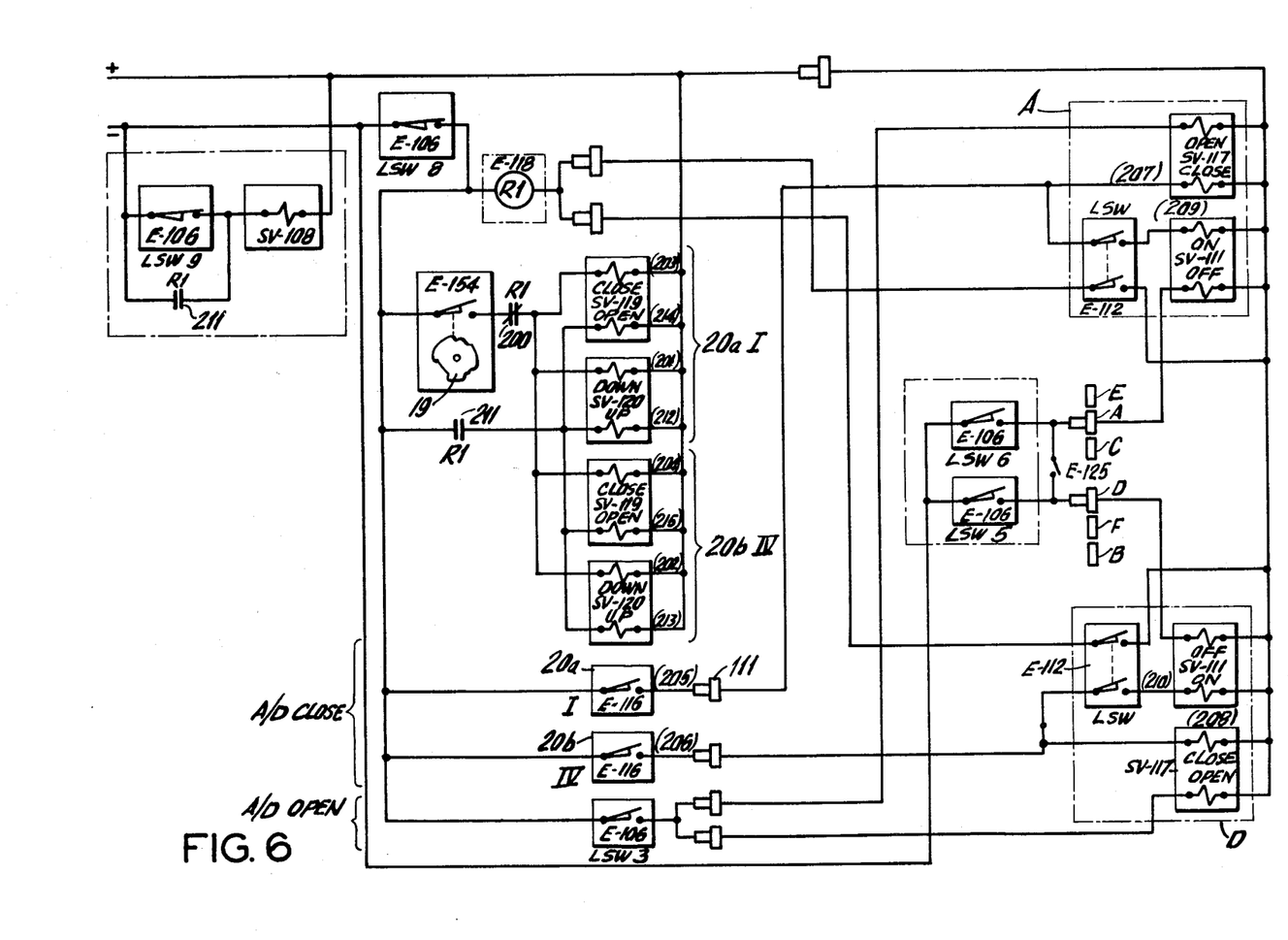
FIG. 6 is a functional schematic of the apparatus of this invention.

In FIG. 6, the functional schematic of the apparatus is simplified to show molds A and D at stations I and IV, respectively. It is of course understood that diametric molds B and E, and C and F could similarly be represented.

In FIG. 6, and referred to herein, the numbers in brackets refer to the particular circuit under discussion.

The screw extruders 11a and 11b are turned "on" to operate simultaneously at identical rates of production. For each and every five turns or rotations of the extruder screw 11a, cam 19 undergoes a single rotation closing switch E-154, closing the circuit through the normally closed contacts 200 of master coil R1 (mounted on master panel, not shown). In closing switch E-154, solenoid valves SV-120a, SV-120b are actuated, permitting compressed air to cylinders 25a and 25b, thereby causing parison loaders 20a and 20b, respectively, to be lowered (201 and 202). Concommitantly, the same closing of switch E-154 actuates solenoid valves SV-119a and SV-119b permitting air to cylinders 54a, 55a and 54b, 55b respectively, thereby causing the closing (203 and 204) of jaws 62a, 63a and 62b, 63b, respectively so as to grab and sever parisons at stations I and IV respectively. As stated insofar as the jaws 62a, 63a and 62b, 63b are quicker acting than lowering members 44a and 44b, the parisons P are first severed and grabbed before actually being lowered.

As parison loaders 20a and 20b are nearing the end of their descent, members 45a and 45b, trip micro-switches E-116a and E-116b, respectively closing the circuits (205 and 206), respectively, so as to actuate the respective mold closing solenoids SV-117A and SV-117D (207 and 208). The circuit connections from the micro-switches E-116a and E-116b to the mold solenoid valves SV-117D are made through brush (typical) and slip ring (typical) of commutator 111 (typical).

As molds A and D close, respectively, mold sections 121A and 121D trip switches E-112A and E-112B closing the blow air "on" circuits (209 and 210), to cause the expansion of the parisons. The closing of circuits (209, 210) also energizes relay R1 and switch E-118, so that R1 normally open contacts 211, close solenoids SV-119A, D and SV-120A, D to cause the parison loaders 20a and 20b to return to their upper positions (circuits 212, 213), and concommitantly to open the parison gripping jaws (62a, 63a, and 62b, 63b), as by circuits (214, 215). Further the closing of normally open contacts 211 of relay R1, clutch solenoid valve SV-108 is energized through table cam limit switch LSW9 of master table cam E-106.

The energizing of clutch solenoid valve SV-108 causes engagement of clutch 102 to start rotation of the turntable.

As the molds rotate 60°, limit switchs LSW5 and LSW6 actuate the closing of the circuit to shut blow air off to the molds (B and E for the case at point) that are next approaching stations I and IV. Upon somewhat further rotation before indexing, limit switch LSW3 closes and energizes solenoid valve SV-117F and SV-117E so as to open the mold to permit unloading of bottles and to institute another indexing cycle.

In FIG. 6, the schematic diagram shown for molds A and D only and therefore limit switches LSW5 and LSW6 will actuate SV-111A and SV-111D to shut off the blow air at about the end of the third index cycle, that is when mold A reaches station IV and mold D reaches station I, at 180° rotation. These operations are of course repeated so that each mold A-D is unloaded and reloaded twice for each 360° rotation of the turntable.

In actuality LSW5 and LSW6 are interconnected through a jump switch E-125 at commutator 111. So that in one index cycle LSW6 of cam E-106 will actuate the air "off" to both molds A and D and in the next index cycle LSW5 of cam E-106 will actuate the air "off" to both molds B and E. That is each limit switch, LSW5 or LSW6, is actuated during each alternate index cycle. Since there are six molds for a 360° rotation, each limit switch LSW5 or LSW6, is actuated every other 60° rotation period of the turntable 10.

Also near the termination of each index cycle LSW8 is actuated to assist commutator 111 in the load switching so as to prolong the useful life of commutator 111.

During discharge of the containers from the respective molds, as aforesaid, and as the molds are entering the respective extruder stations I and IV, LSW9 of cam E-106 actuates SV-108 to disengage clutch 102 causing the turntable to stop. That is to say the mold comes to a complete stop to discharge the container and immediately thereafter receive the next formed parison which is being lowered into the now opened and unloaded mold. (See action sequence of FIG. 4). This combination of parison loading and container unloading as the turntable is indexed, minimizes the dwell time at the extruder stations.

Since each mold undergoes bottle unloading and parison loading twice for each rotation, production rates can in theory be doubled that of conventional systems.

Furthermore, while the molds A-D are shown as being identical in the preferred embodiment this need not be the case and it is within the contemplation of this invention to produce at least two different products simultaneously with a single rotary turntable. Further the thermoplastic material at each extruder, e.g. 11a and 11b, need not be the same but may vary in polymer structure or certain physical properties such as color. Therefore it is also within the contemplation of this invention to simultaneously produce at least two products of different polymers and/or color with a single rotary turntable.

It is within the contemplation of this invention that the means to form a parison comprise a thermoplastic extruder and die operatively positioned at a station. Further it is also within the contemplation of this invention that means to form a parison comprise a single extruder with means to convey the extruded mass to at least two separate dies, wherein each of the dies being operatively positioned at first and second stations circumferentially spaced one from the other. In other words while it may be desirable, it is not necessary to provide separate extruders at each station whereat a parison is to be formed. Molten thermoplastic material may be conveyed to parison forming dies at any desired station or number of stations. Therefore the terms "means to form a parison" is defined herein as including the immediately aforesaid arrangement of a single extruder with separate remote die means as well as the heretofore described preferred embodiment.

Further it is also within the contemplation of this invention to have more than two extruder stations in operation so as to further increase the production rates. Also of course more than one parison may be formed at each extruder station and several containers may be blow molded simultaneously at each mold assembly.

As can be seen the above description discloses a method and apparatus for producing hollow plastic articles such as containers at substantially higher rates of production than was previously heretofore possible with a rotary indexing turntable.

From the foregoing description of the invention, it will be apparent that various modifications in the method and apparatus described in detail herein, may be made without departing from the spirit and scope of the invention and it is not intended that the invention be limited to the specific embodiment shown herein, but is to be construed according to the appended claims.

What is claimed is:

1. A blow molding apparatus comprising a rotary indexing turntable, means to rotatably index the turntable to a predetermined number of circumferentially spaced stations, said turntable having at least one partible mold mounted therewith for each of the circumferentially spaced stations, means to provide opened molds at at least first and second of said spaced stations, means to form a first parison to be operatively positioned at said first station and to form a second parison to be operatively positioned at said second station circumferentially spaced from said first station, means to position said first parison and means to position said second parison between the parted sections of each of the respective molds at the respective first and second stations, means to close said opened molds on said positioned parisons at the respective first and second stations, said each of said means to close said partible molds comprises switch means mounted on said apparatus so as to be actuated by the positioning movement of said positioning means, said switch means in turn actuating means interconnecting parted sections of the opened mold so as to close the mold along a line coincident with the axis of the positioned parison, means to introduce air under pressure to the interior of each of the respective parisons to expand the parisons to conform to the interior of the respective molds so as to form hollow object therein, means to cool each of said objects during rotation of the turntable and circumferential transfer of the molds from at least said respective first and second stations, and means for removing the formed objects from the opened molds at at least said first and second stations so as to permit other parisons to be positioned therebetween.

2. The blow molding apparatus of claim 1, wherein said means to position said first parison and said means to position said second parison being operable simultaneously.

3. The apparatus of claim 1, wherein each of said parison positioning means comprises means to lower a parison of predetermined length between said parted sections of the respective mold.

4. The blow molding apparatus of claim 3, wherein each of said parison positioning means actuates respective switch means.

5. The blow molding apparatus of claim 1, wherein said means to form a first parison comprises first extruder means and means to form a second parison comprises a second extruder means, said first and second extruder means being spaced.

6. The blow molding apparatus of claim 5, wherein said means to position said first parison is operatively mounted with said first extruder means and said means to position said second parison is operatively mounted with said second extruder means.

7. The blow molding apparatus of claim 1, wherein each of said means to position said parison comprises vertical positioning means.

8. The apparatus of claim 1, wherein each of said means to position said parison is spaced from the rotary turntable.

9. The apparatus of claim 1, further comprising switch means to actuate said means to rotate said turntable from one spaced station to the next spaced station upon closure of both of said molds.

10. The apparatus of claim 9, wherein each of said means to position said parison comprises vertical positioning means.

* * * * *